(12) United States Patent
Crowl

(10) Patent No.: US 11,351,822 B1
(45) Date of Patent: Jun. 7, 2022

(54) RECEIVER HITCH LIFT SYSTEM

(71) Applicant: Battle Armor Designs, LLC, Batesville, AR (US)

(72) Inventor: Zachary Crowl, Batesville, AR (US)

(73) Assignee: Battle Armor Designs, LLP, Batesville, AR (US)

( * ) Notice: Subject to any disclaimer, the term of this patent is extended or adjusted under 35 U.S.C. 154(b) by 388 days.

(21) Appl. No.: 16/358,009

(22) Filed: Mar. 19, 2019

(51) Int. Cl.
 *B60D 1/36* (2006.01)
 *B60D 1/06* (2006.01)
 *B60D 1/54* (2006.01)

(52) U.S. Cl.
 CPC .............. *B60D 1/36* (2013.01); *B60D 1/065* (2013.01); *B60D 1/54* (2013.01)

(58) Field of Classification Search
 CPC ............. B60D 1/36; B60D 1/54; B60D 1/065
 See application file for complete search history.

(56) References Cited

U.S. PATENT DOCUMENTS

| | | | |
|---|---|---|---|
| 4,148,499 A * | 4/1979 | Johnson ................. | B60D 1/465 280/479.1 |
| 4,256,324 A | 3/1981 | Hamilton | |
| 4,564,209 A * | 1/1986 | Kingsley ................ | B60D 1/465 180/199 |
| 4,570,966 A | 2/1986 | Giboney et al. | |
| 6,155,588 A * | 12/2000 | Maxey ................... | B60D 1/465 280/468 |
| 6,409,202 B1 * | 6/2002 | Putnam ................... | B60D 1/06 280/495 |
| 6,447,000 B1 * | 9/2002 | Dick ...................... | B60D 1/246 280/491.5 |
| 7,264,260 B2 * | 9/2007 | Overstreet .............. | B60D 1/28 280/461.1 |
| 7,775,545 B2 * | 8/2010 | Dick ...................... | B60D 1/54 280/491.1 |
| 8,172,248 B2 * | 5/2012 | Groves ................... | B60P 1/027 280/414.5 |
| 8,276,929 B1 * | 10/2012 | Baker .................... | B60D 1/36 280/490.1 |
| 8,306,703 B1 * | 11/2012 | Saleh ..................... | B66F 9/205 701/49 |
| 9,469,171 B2 * | 10/2016 | Morga ................... | B60D 1/246 |
| 11,014,793 B2 * | 5/2021 | Saleh ..................... | B66F 9/141 |
| 2007/0272421 A1 * | 11/2007 | Elliott .................. | A01B 59/064 172/445.1 |
| 2012/0313346 A1 * | 12/2012 | Steins .................. | B62D 63/061 280/401 |
| 2015/0137483 A1 * | 5/2015 | Morga ................... | B60D 1/52 280/477 |

* cited by examiner

*Primary Examiner* — Jacob B Meyer
*Assistant Examiner* — Marlon A Arce
(74) *Attorney, Agent, or Firm* — Bracewell LLP; Christopher L. Drymalla

(57) ABSTRACT

Provided are embodiments of a hitch lift system including an elongated receiver member configured to engage a complementary opening of a receiver hitch of a vehicle, and a lift system that includes a lifting shaft adapted that extends and retracts vertically, and a lifting system to regulate the vertical extension and retraction of the lifting shaft.

19 Claims, 7 Drawing Sheets

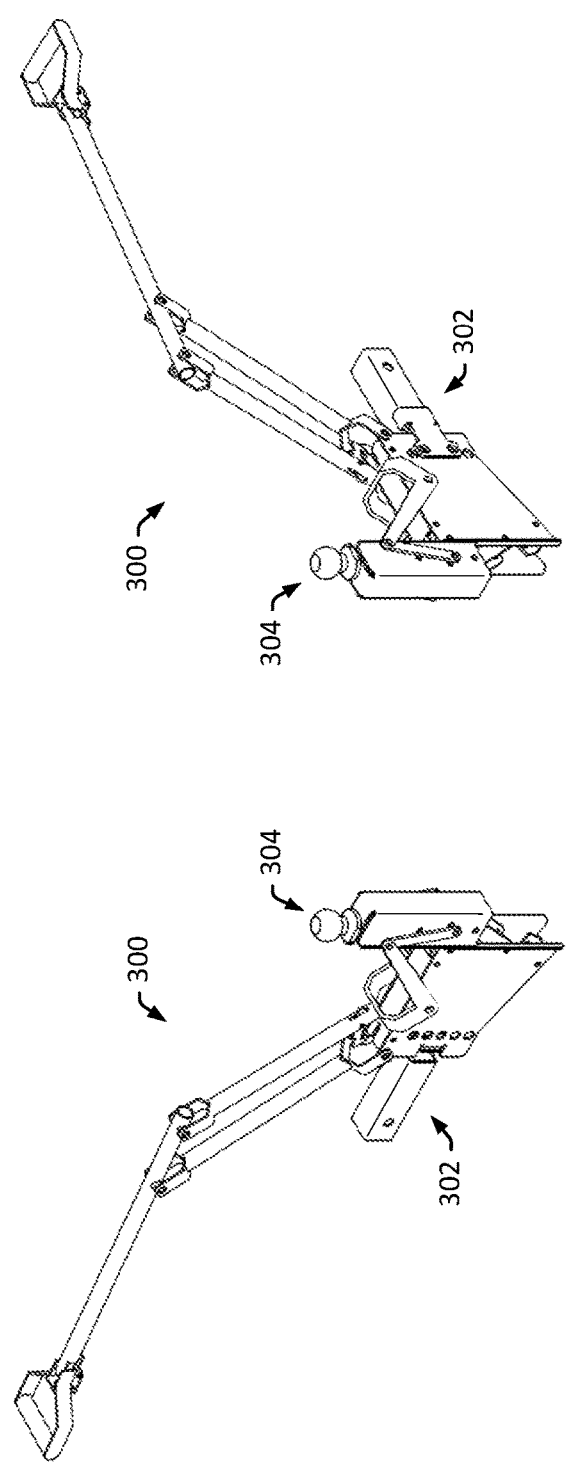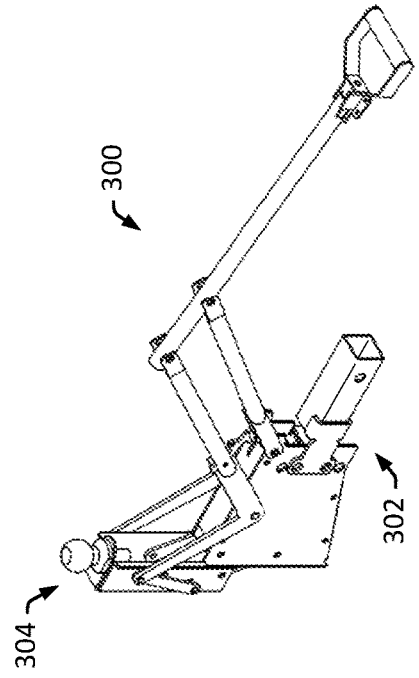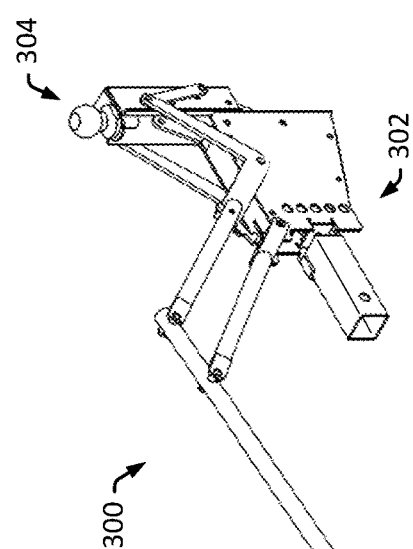
FIG. 3A
FIG. 3B
FIG. 3C
FIG. 3D

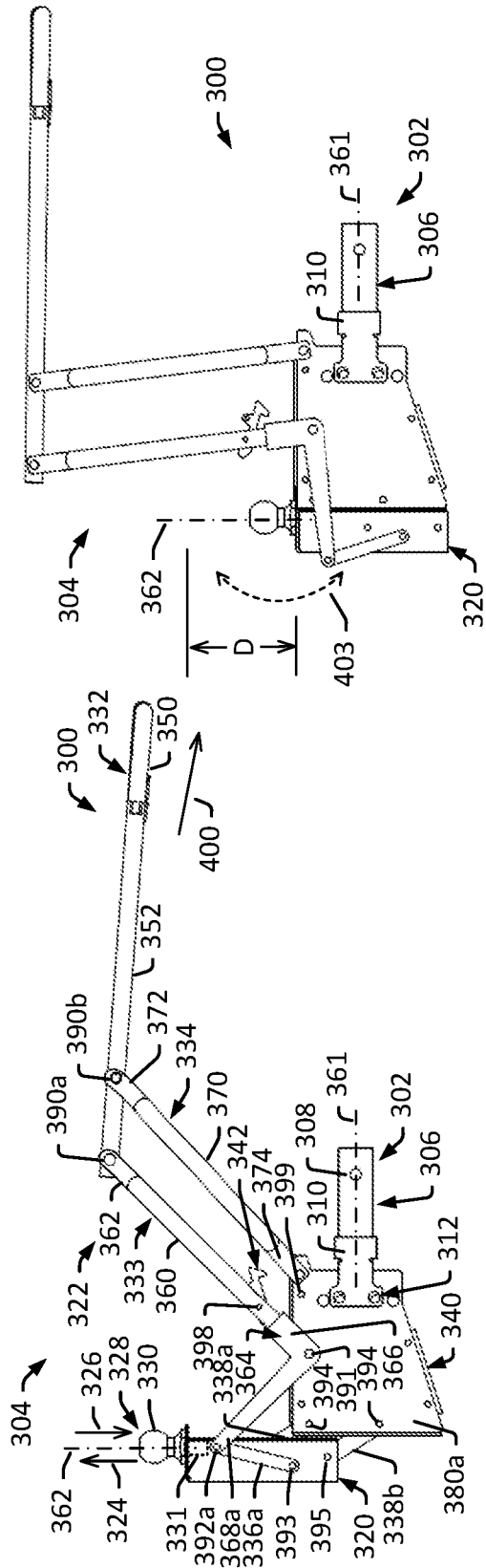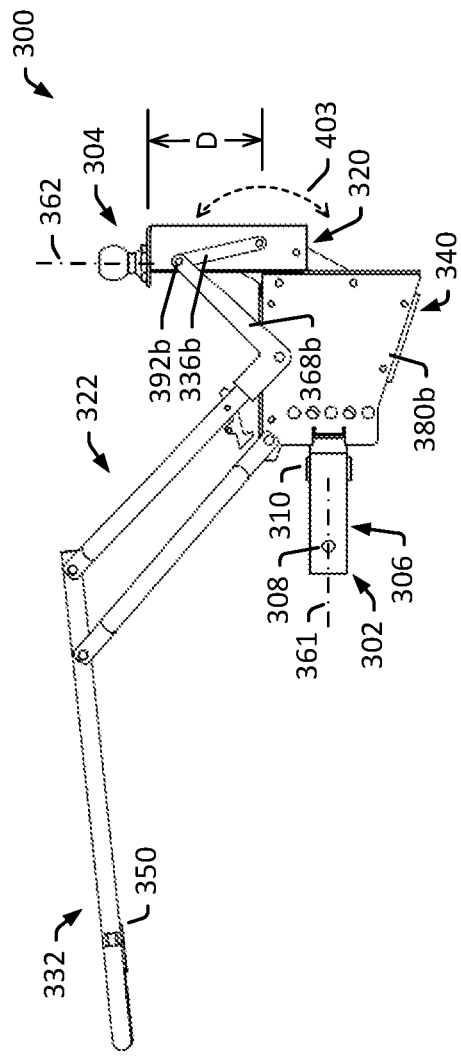
FIG. 3E
FIG. 3F
FIG. 3G

RECEIVER HITCH LIFT SYSTEM

FIELD

Embodiments relate generally to tow hitch devices and more particularly to a receiver hitch lift system.

BACKGROUND

Vehicles often have a tow hitch that can be used to tow loads. For example, vehicles, such as trucks, tractors and riding lawnmowers, often include a tow hitch that can be used to tow trailers, implements or other loads. In many instances, a tow hitch includes a tow ball and the load includes a complementary coupler that is secured to the ball. For example, a vehicle may have a tow hitch with a tow ball secured to a frame of the vehicle and a trailer may have a tongue having a coupler that can be coupled (or "hitched") to the tow ball. During a towing operation, the coupler is typically hitched to the tow ball, and the vehicle is driven to tow the load from one location to another. For example, a person may move the vehicle such that the tow ball is near a trailer, leave the vehicle and walk to the trailer, lift the tongue of the trailer to position the coupler on the tow ball, raise a trailer jack previously supporting the tongue of the trailer, hitch the coupler to the tow ball, return to the vehicle, and drive the vehicle some distance while towing the "hitched" trailer by way of the coupling between the tow ball and the coupler. Once the towing operation is complete, the coupler is typically de-coupled (or "un-hitched") from the tow ball, and the vehicle is moved away, leaving the load in place. For example, the person may stop the vehicle with the trailer in a desired location, leave the vehicle and walk to the trailer, un-hitch the coupler from the tow ball, lift the tongue of the trailer to move the coupler off of the tow ball, lower the trailer jack to support the tongue of the trailer, return to the vehicle, and drive the vehicle some distance away from the trailer, leaving the "un-hitched" trailer in-place.

A tow hitch often includes a receiver-type hitch, having a receiver hitch (or "receiver") mounted to a frame of a vehicle with an opening sized to accept a complementary receiver member. The receiver may be, for example, a rigid bar type structure attached (e.g., bolted or welded) to the frame of the vehicle. The receiver member may be, for example, an elongated member that can be slid into the opening of the receiver with a tow ball coupled thereto. In many instances, the receiver member is removably coupled to the receiver by way of removable pin. Such a configuration may facilitate removal and exchange of the receiver member and tow ball.

SUMMARY

Applicant has recognized that, although traditional tow hitch systems work well for towing loads, traditional tow hitch systems can require a relatively large amount of effort for certain towing related activities. For example, in the case a person wanting to simply move a trailer a short distance, she/he may have to perform traditional hitching and un-hitching operations. That is, to move a trailer a short distance (e.g., 10 feet), a person may move a vehicle near the trailer, leave the vehicle and walk to the trailer, lift the tongue of the trailer to position the coupler on a tow ball, raise a trailer jack previously supporting the tongue of the trailer, couple (or "hitch") the coupler to the tow ball, return to the vehicle, drive the vehicle 10 feet while towing the "hitched" trailer, leave the vehicle and again walk to the trailer, de-couple (or "un-hitch") the coupler from the tow ball, lift the tongue of the trailer to move the coupler off of the tow ball, lower the trailer jack to support the tongue of the trailer, return to the vehicle, and drive the vehicle away from the trailer, leaving the "un-hitched" trailer in-place. In many instances, a person may forgo moving a load due to the time and effort required for traditional hitching and un-hitching operations. For example, where grass is growing under a trailer in person's lawn, she/he may decide to forgo moving the trailer to mow the grass due the time and effort required to move the trailer. Moreover, Applicant has recognized potential hazards and complexities that can be introduced with traditional hitching and un-hitching operations. For example, there is a potential of a person falling while leaving the vehicle or walking to the trailer, and a potential of the person hurting her/his hands or back while lifting the trailer. Further, a person may have to stop and start the vehicle's engine each time she/he leaves and returns to the vehicle, thus adding to the time and effort to hitch and un-hitch from a load.

Recognizing these and other shortcomings of existing traditional tow hitch systems, Applicant has developed novel hitch lift systems. In some embodiments, a hitch lift system includes a vertically oriented lifting shaft that can be extended upward to lift a load. For example, a hitch lift system may include a vertically oriented lifting shaft having a tow ball positioned at an upper end of the shaft. During a hitching operation, the hitch lift system may be positioned such that the tow ball is located under a coupler of a load (e.g., under a coupler of a trailer), and the lifting shaft may be extended (or "raised") such that that the tow ball moves upward to engage (or "hitch") the tow ball with the coupler, and continue to be extended upward to raise (or "lift") the coupler. During an un-hitching operation, the lifting shaft may be retracted (or "lowered") such that that tow ball moves downward to lower the coupler of the trailer, and disengage (or "un-hitch") the tow ball from the coupler. Such a hitch lift system may enable a person to hitch to, move with, and un-hitch from a load without having to engage in traditional hitching and un-hitching operations. For example, a person may simply drive a vehicle into a position that aligns a tow ball of the hitch lift system under a coupler of a trailer, operate the hitch lift system to raise the tow ball to engage and lift the coupler of the load, drive the vehicle some distance to tow the hitched trailer to a new location, operate the hitch lift system to lower the tow ball to lower and disengage from the coupler of the trailer, and drive the vehicle away from the un-hitched trailer, leaving the trailer in the new location.

Although some embodiments are described in the context of certain types of vehicles or loads, such as a riding lawnmower and trailer, for the purpose of illustration, the described embodiments can be employed in other contexts. For example, embodiments described may be employed with of other types of vehicles, such as trucks and tractors, and other types of loads, such as implements. Implementation of the described embodiments may be limited by the capabilities of the hitch lift system. For example, the hitch lift systems described may be designed for use with relatively light loads (e.g., for lifting and towing small trailers) or for towing at relatively low speeds (e.g., for towing at less than five miles per hour). Such systems may not be Department of Transportation (DOT) approved for use in certain scenarios. For example, a hitch lift system may not be DOT approved for towing on roads or highways. Thus, it is important for users to recognize and understand the limitations and approved uses of such hitch lift systems, and to operate them in accordance with the limitations and approved uses.

Provided in some embodiments is a hitch lift system including: a receiver system including a receiver member adapted to engage a complementary opening of a receiver hitch of a vehicle; and a hydraulic lift system including: a lifting shaft adapted to translate vertically in an upward direction to lift a complementary coupler of a load; and a hydraulic lift adapted to generate hydraulic pressure to cause the lifting shaft to translate vertically in the upward direction.

In some embodiments, the receiver member is adapted to slidingly engage the complementary opening of the receiver hitch of the vehicle. In certain embodiments, the receiver member includes a square tubular member adapted to slide into the complementary opening of the receiver hitch of the vehicle. In some embodiments, the receiver member includes a 1¼ inch or 2 inch square tubular member. In certain embodiments, the lifting shaft includes an elongated shaft including a rounded lifting end adapted to engage the complementary coupler of the load. In some embodiments, the lifting shaft includes an elongated shaft including a tow ball adapted to engage the complementary coupler of the load. In certain embodiments, the hydraulic lift is adapted to reduce hydraulic pressure to cause the lifting shaft to translate vertically in a downward direction to lower the complementary coupler of the load. In some embodiments, the hydraulic lift system includes: a hydraulic pump; and a hydraulic lift chamber, where the hydraulic pump is adapted to pump hydraulic fluid into the hydraulic lift chamber to generate the hydraulic pressure in the hydraulic lift chamber to cause the lifting shaft to translate vertically in the upward direction. In certain embodiments, the hydraulic lift system is adapted to displace hydraulic fluid from the hydraulic lift chamber to reduce hydraulic pressure in the hydraulic lift chamber to cause the lifting shaft to translate vertically in a downward direction to lower the complementary coupler of the load. In some embodiments, the hydraulic pump is adapted to pump hydraulic fluid from the hydraulic lift chamber to reduce hydraulic pressure in the hydraulic lift chamber to cause the lifting shaft to translate vertically in a downward direction to lower the complementary coupler of the load. In certain embodiments, the hydraulic pump includes an electric pump. In some embodiments, the electric pump is adapted to operate using 12 volt power. In certain embodiments, the hitch lift system further includes a wiring harness including a power lead adapted to route operational power to the hydraulic hitch lift system. In some embodiments, the receiver member includes a receiver member longitudinal axis, the lifting shaft include a lifting shaft longitudinal axis, the lifting shaft longitudinal axis is transverse to the receiver member longitudinal axis, the receiver is adapted to be oriented such that the receiver member longitudinal axis is oriented horizontally during use, and the lifting shaft is adapted to be oriented such that the lifting shaft longitudinal axis is oriented vertically during use. In certain embodiments, the vehicle includes a motor vehicle. In some embodiments, the vehicle includes a riding lawn mower. In certain embodiments, the hitch lift system further includes a remote controller adapted to be operated by an operator of the vehicle to control the hitch lift system to lift the complementary coupler of the load.

Provided in some embodiments is a hitch lift system including: a receiver member having a receiver member longitudinal axis and being adapted to engage a complementary opening of a receiver hitch of a vehicle; and a hydraulic lift system including: a lifting shaft having a lifting shaft longitudinal axis oriented transverse to the receiver member longitudinal axis, the lifting shaft adapted to extend and retract along the lifting shaft longitudinal axis; and a hydraulic lift adapted to generate hydraulic pressure to cause the lifting shaft to extend along the lifting shaft longitudinal axis.

Provided in some embodiments is a hitch lift system including: an elongated receiver member adapted to engage a complementary opening of a receiver hitch of a vehicle; and a lift system including: a lifting shaft adapted to extend and retract vertically; and a lift adapted to regulate the vertical extension and retraction of the lifting shaft.

BRIEF DESCRIPTION OF THE DRAWINGS

FIGS. 3A-3G are diagrams that illustrate various view of a mechanical hitch lift system in accordance with one or more embodiments.

Figure 1A:
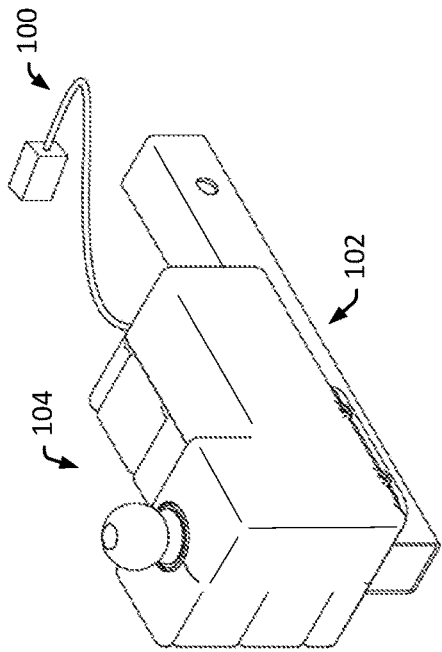
FIGS. 1A-1J are diagrams that illustrate various view of a hydraulic hitch lift system in accordance with one or more embodiments.
Figure 1B:
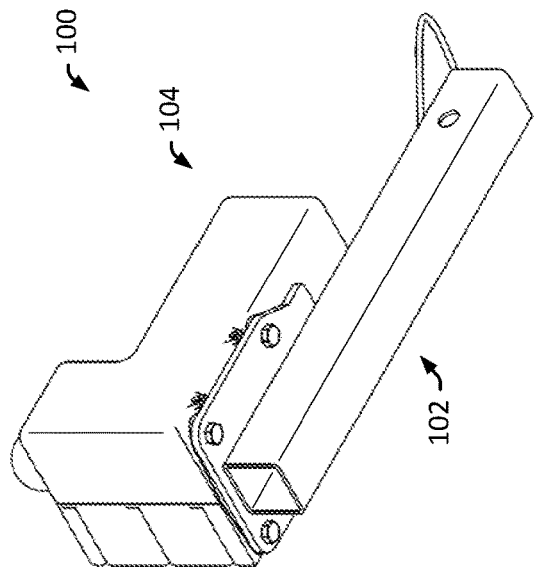
Figure 1C:
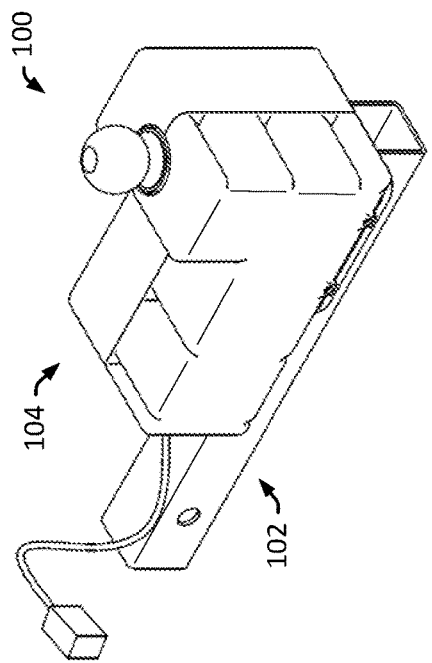
Figure 1D:
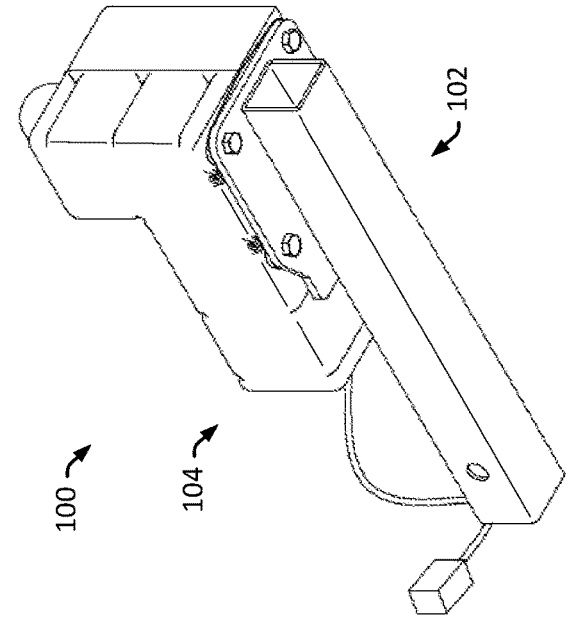

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of a hitch lift system. In some embodiments, a hitch lift system includes a vertically oriented lifting shaft that can be extended upward to lift a load. For example, a hitch lift system may include a vertically oriented lifting shaft having a tow ball positioned at an upper end of the shaft. During a hitching operation, the hitch lift system may be positioned such that the tow ball is located under a coupler of a load (e.g., under a coupler of a trailer), and the lifting shaft may be extended (or "raised") such that that the tow ball moves upward to engage (or "hitch") the tow ball with the coupler, and continue to be extended upward to raise (or "lift") the coupler. During an un-hitching operation, the lifting shaft may be retracted (or "lowered") such that that tow ball moves downward to lower the coupler of the trailer, and disengage (or "un-hitch") the tow ball from the coupler. Such a hitch lift system may enable a person to hitch to, move with, and un-hitch from a load without having to engage in traditional hitching and un-hitching operations. For example, a person may simply drive a vehicle into a position that aligns a tow ball of the hitch lift system under a coupler of a trailer, operate the hitch lift system to raise the tow ball to engage and lift the coupler of the load, drive the vehicle some distance to tow the hitched trailer to a new location, operate the hitch lift system to lower the tow ball to lower and disengage from the coupler of the trailer, and drive the vehicle away from the un-hitched trailer, leaving the trailer in the new location.

In some embodiments, a hitch lift system includes a receiver system and a lift system. As described, in some embodiments, the receiver system includes a receiver member that, during use, is disposed in a horizontal orientation (e.g., slid horizontally into a horizontally oriented opening of a receiver of a vehicle) and the hitch lift system includes an extendable lifting shaft that, during use, is provided in a vertical orientation and is operable to move vertically. For example, the lifting shaft may be extend in an upward direction (or "raised") to engage and lift a coupler of a load, or be retracted in a downward direction (or "lowered") to lower or disengage from a coupler of a load. In some embodiments, the lifting shaft translates in a straight path. For example, the lifting shaft may be raised or lowered in a straight path along its longitudinal axis.

In some embodiments, the receiver member is sized to engage a complementary receiver hitch of a vehicle. For example, the receiver member may include elongated square tubing (e.g., square tubing about 16 inches (in) in length) that is sized to slide into a complementary square opening of a receiver hitch of a vehicle. The square opening may be for example, two inches square or 1¼ inches square, which are common sizes for class III and class I and II hitches, respectively. The square tubing may have an outer height and width that is slightly smaller than the height and width of the complementary square opening (e.g., slightly less than two inches or 1¼ inches square) that enables the square tubing to slide into the complementary square opening. In some embodiments, the receiver member is removably coupled to the lift system. For example, the receiver member may be attached to the lift system with bolts or other fasteners. This may enable the receiver member to be replaced, for example, if a different type or size receiver member is needed for a given vehicle, or the receiver member is damaged.

In some embodiments, the lift system includes a lift operable to cause the vertical movement of the lifting shaft. For example, the lift system may include the lifting shaft and a lift device that regulates the raising or lowering of the lifting shaft.

In some embodiments, the lifting shaft includes an upper end that is shaped to facilitate engagement with a load. For example, the lifting shaft may include an upper end (or "lifting end") that is rounded to facilitate engagement of the upper end of the lifting shaft into a coupler shaped to accept a rounded tow ball. In some embodiments, the lifting end may have a tow ball. For example, the lifting end of the lifting shaft may include a 1⅞ inch, 2 inch, or 2⁵⁄₁₆ inch round tow ball. In some embodiments, the tow ball is integrated with the lifting shaft. For example, the tow ball may be machined, forged, welded or otherwise formed as an integrated element of the lifting shaft. In some embodiments, the tow ball is removably coupled to a portion of the lifting shaft. For example, the lifting shaft may have a female thread extending into an upper end of the lifting shaft, and the tow ball may have a male threaded stem that is threaded into the female thread. This may enable the tow ball to be exchanged easily, for example, if different loads use different sizes or styles of tow balls, or the tow ball is damaged.

In some embodiments, the lift system includes a hydraulic lift system. A hydraulic lift system may employ fluid pressure to provide force that regulates vertical translation of the lifting shaft. A hydraulic lift system may be operable to regulate hydraulic fluid pressure and volume to regulate the vertical translation of the lifting shaft. For example, the lift system may include a hydraulic lift chamber, a hydraulic fluid reservoir and a hydraulic pump. The hydraulic pump may be operable to pump a volume of hydraulic fluid from the hydraulic fluid reservoir into the hydraulic lift chamber to generate a hydraulic pressure in the hydraulic lift chamber. The hydraulic pressure in the hydraulic lift chamber may generate a corresponding hydraulic force that pushes upward against the lifting shaft to raise the lifting shaft (e.g., to cause the lifting shaft to translate vertically in the upward direction). The hydraulic pump may be operable to pump a volume of hydraulic fluid from the hydraulic lift chamber into the hydraulic fluid reservoir to reduce hydraulic pressure in the hydraulic lift chamber. The reduced hydraulic pressure in the hydraulic lift chamber may reduce a hydraulic force pushing upward against the lifting shaft, and may create a vacuum that pulls downward on the lifting shaft, thereby causing the lifting shaft to lower (e.g., to translate vertically in the downward direction). In some embodiments, the hydraulic lift system includes a pressure relief valve that is operable to enable hydraulic fluid to flow from the hydraulic lift chamber into the hydraulic fluid reservoir, thereby reducing hydraulic pressure in the hydraulic lift chamber and causing the lifting shaft to lower. In such an embodiment, the flow of the hydraulic fluid from the hydraulic lift chamber into the hydraulic fluid reservoir may result, for example, from the pressure relief valve being opened and the downward force generated by the weight of the lifting shaft (or a load supported by the lifting shaft). In some embodiments, the pressure relief valve is opened in place of, or in conjunction with, the hydraulic pump being operated to pump hydraulic fluid from the hydraulic lift chamber into the hydraulic fluid reservoir.

In some embodiments, the hydraulic pump is an electric hydraulic pump. For example, the hydraulic pump may be an electric hydraulic pump that operates using 12 volt (V) electrical power. Such a 12 V pump may be advantageous as 12 V electrical power is commonly available on vehicles, such as riding lawnmowers, and thus operational power may be sourced from a vehicle to which the hitch lift system is coupled. In some embodiments, the lift system includes a wiring harness that routes operational power or control signals to the lift system. For example, the lift system may include a wiring harness having a power lead that that routes operational power from a power source (e.g., a 12 V electrical system of a vehicle to which the hitch lift system is coupled) to the electric hydraulic pump or other components of the hitch lift system.

Figure 1E:
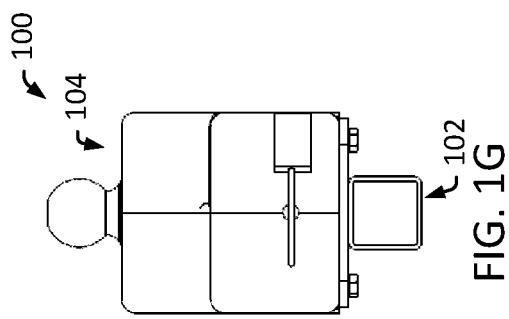
Figure 1F:
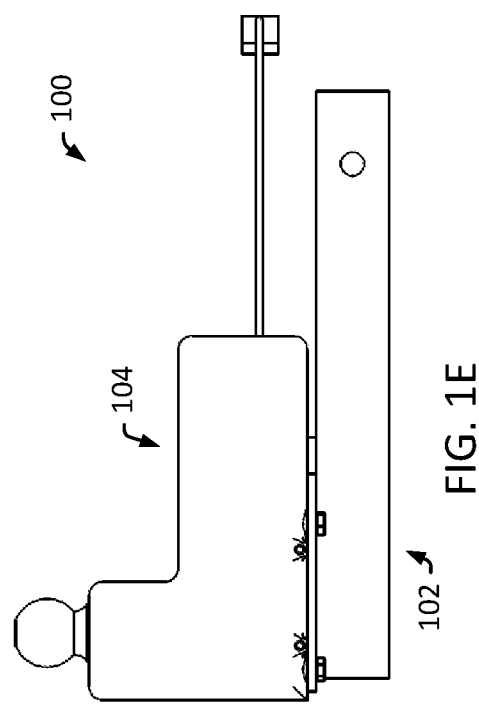
Figure 1G:
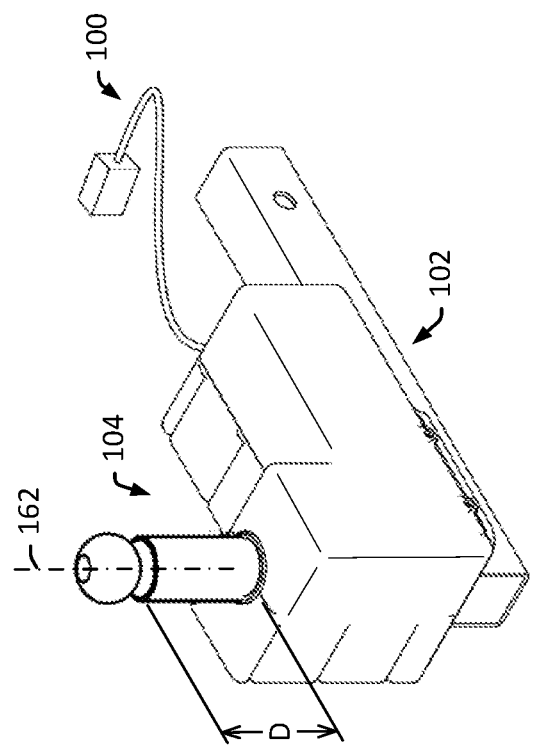
Figure 1H:
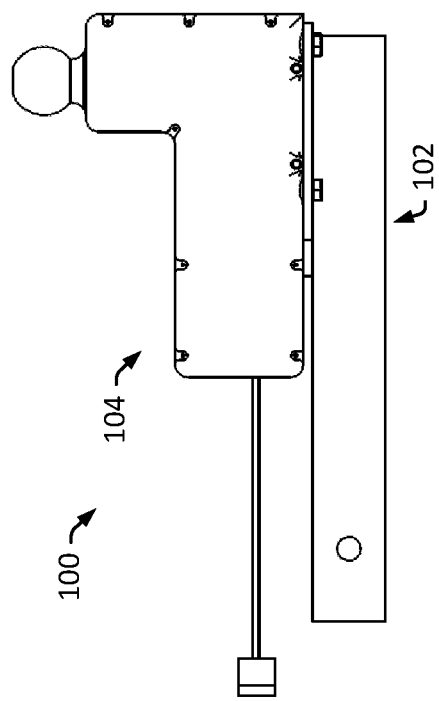
Figure 1I:
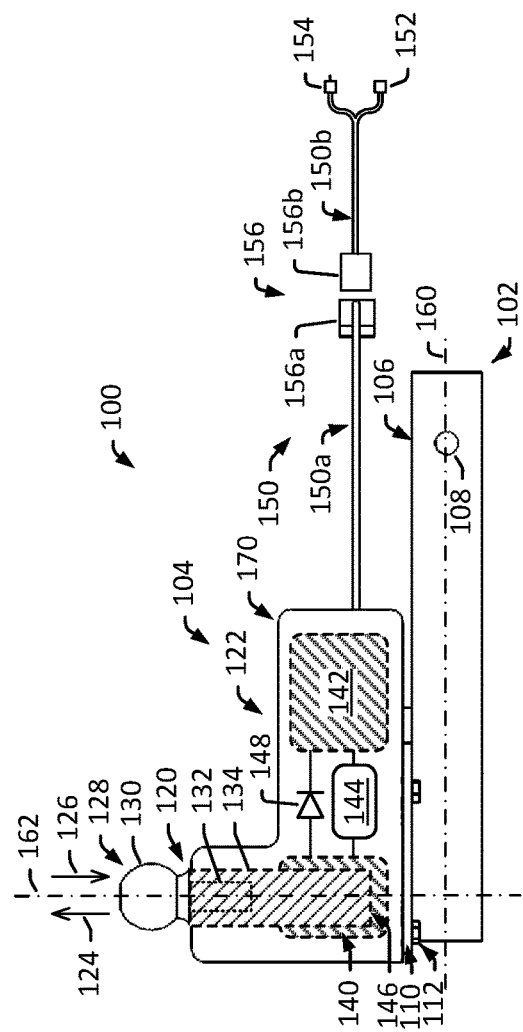
Figure 1J:
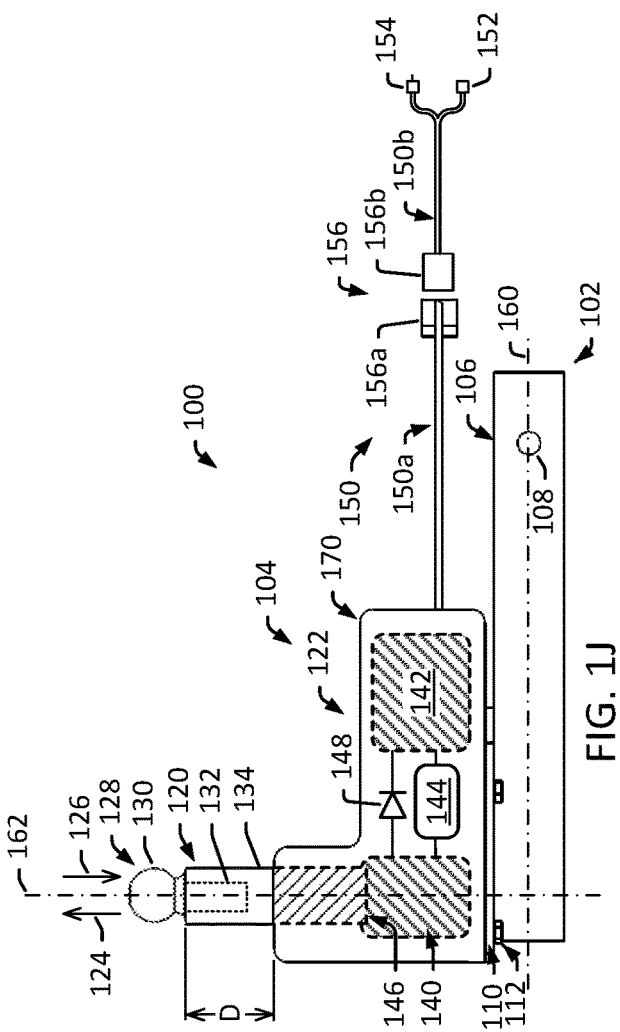

FIGS. 1A-1J are diagrams that illustrate views of a "hydraulic" hitch lift system 100 in accordance with one or more embodiments. FIGS. 1A-1D illustrate front-top-left, front-top-right, front-bottom-left, and front-bottom-right perspective views, respectively, of the hitch lift system 100 in a retracted/lowered configuration. FIGS. 1E-1G illustrate right-side, left-side, and rear-end views, respectively, of the hitch lift system 100 in a retracted/lowered configuration. FIG. 1H illustrates a front-top-right perspective view of the hitch lift system 100 in an extended/raised configuration. FIGS. 1I and 1J illustrate right-side views of the hitch lift system 100 in a retracted/lowered configuration and an extended/raised configuration, respectively.

In the illustrated embodiment, the hitch lift system 100 includes a receiver system 102 and a lift system 104. The receiver system 102 includes a receiver member 106 that is sized to engage a complementary receiver hitch of a vehicle. For example, the receiver member 106 may include elongated square tubing that is sized to slide into a complementary square opening of a receiver hitch of a vehicle, as described here. In the illustrated embodiment, the receiver member 106 includes a pin hole 108 (see, e.g., FIGS. 1I and 1J). The pin hole 108 may be sized and positioned to receive a complementary receiver hitch pin that can be used to secure the receiver member 106 and the hitch lift system 100 to a receiver. For example, the receiver member 106 may be slid into a complementary square opening of a receiver hitch of a vehicle such that the pin hole 108 aligns with a complementary pin hole in the complementary square opening, and a receiver hitch pin may be slid through the pin hole 108 and the complementary pin hole to couple the receiver member 106 and the hitch lift system 100 to the receiver hitch. The receiver hitch pin may be held in place by a cotter pin.

In the illustrated embodiment, the receiver member 106 includes a lift system mounting plate 110 (see, e.g., FIGS. 1I and 1J). The receiver member 106 may be removably coupled to the lift system 104 by way of fasteners 112, such as nuts and bolts, that extend through complementary holes of the lift system mounting plate 110 and the lift system 104. This may enable the receiver member 106 to be replaced if a different type or size receiver member is needed for a given vehicle or the receiver member 106 is damaged. In some embodiments, the lift system mounting plate 110 is fixedly coupled to the receiver member 106, for example, by way of a weld.

In the illustrated embodiment, the lift system 104 is a "hydraulic" lift system that includes a lifting shaft 120 and a hydraulic lift 122 (see, e.g., FIGS. 1I and 1J). The lift system 104 may be operable to cause vertical translation of the lifting shaft 120. For example, during use, the lifting shaft 120 may be raised/extended (in the direction of arrow 124) or lowered/retracted (in the direction of arrow 126). The lifting shaft 120 may be raised to cause an upper end 128 of the lifting shaft 120 to engage and lift a complementary coupler of a load, such as a coupler of a trailer. The lifting shaft 120 may be lowered to lower or disengage from a complementary coupler of a load. In some embodiments, the lifting shaft translates (e.g., is raised or lowered) in a straight path along a lifting shaft longitudinal axis 162. The lifting shaft longitudinal axis 162 may be defined by a longitudinal axis of the lifting shaft 120.

In some embodiments, the lifting shaft 120 includes a telescoping shaft. For example, the lifting shaft 120 may include a lower lifting shaft including a cylindrical tube having an external diameter and an internal diameter, and an upper lifting shaft including a cylindrical tube or cylinder having an external diameter that is slightly less than the internal diameter of the lower lifting shaft. The upper lifting shaft may be disposed in the interior of the lower lifting shaft with a seal formed between the interior of the lower lifting shaft and the exterior of the upper lifting shaft. Extension of the lifting shaft 120 may include the lower lifting shaft extending upward, and the upper lifting shaft sliding upward within the lower lifting shaft such that the upper lifting shaft extends through an upper end of the lower lifting shaft. Retraction of the lifting shaft 120 may include the lower lifting shaft being retracted, and the upper lifting shaft sliding downward within the lower lifting shaft such that the upper lifting shaft retracts through the upper end of the lower lifting shaft.

In some embodiments, the lifting shaft 120 has a stroke length (D) defined by a vertical distance of travel of the lifting shaft 120, which may be the difference between the position of the lifting shaft 120 in a fully extended configuration and the position of the lifting shaft 120 in a fully retracted configuration (see, e.g., FIGS. 1H, 1I and 1J). The stroke length (D) maybe about 6-18 inches. In the illustrated embodiment, the lifting shaft 120 includes an upper end (or "lifting end") 128 that is rounded to facilitate engagement with a load. For example, in the illustrated embodiment, the upper end 128 of the lifting shaft 120 includes a rounded tow ball 130 that facilitates engagement of the upper end 128 of the lifting shaft 120 with a coupler shaped to accept a rounded tow ball. The tow ball 130 may include a 1⅞ inch, two inch, or 2 5/16 inch tow ball, for example. In some embodiments, the tow ball 130 is integrated with elements of the lifting shaft 120. For example, the tow ball 130 may be machined, forged, welded or otherwise formed as an integrated element of the upper end 128 of the lifting shaft 120. In some embodiments, the tow ball 130 is removably coupled to a portion of the lifting shaft 120. For example, the lifting shaft 120 may have a female thread 132 extending into an upper end of an elongated member forming a base 134 of the lifting shaft 120, and the tow ball 130 may have a complementary male threaded stem that is threaded into the female thread 132. This may enable the tow ball 130 to be replaced, for example, if different loads use different sizes or styles of tow balls or the tow ball is damaged.

In some embodiments, the hydraulic lift system 104 is operable to regulate hydraulic fluid pressure and volume to regulate the raising or lowering of the lifting shaft 120. For example, as illustrated in FIGS. 1I and 1J, the lift system 104 may include a hydraulic lift chamber 140, a hydraulic fluid reservoir 142 and a hydraulic pump 144. The hydraulic lift chamber 140 may be located adjacent an underside 146 of the lifting shaft 120 such that hydraulic pressure in the hydraulic lift chamber 140 generates a corresponding "upward" hydraulic force that acts on the underside 146 of the lifting shaft 120. During a lifting operation, the hydraulic pump 144 may be operated to pump hydraulic fluid from the hydraulic fluid reservoir 142 into the hydraulic lift chamber 140 to generate or increase hydraulic pressure in the hydraulic lift chamber 140. The hydraulic pressure in the hydraulic lift chamber 140 may produce a corresponding hydraulic force that pushes upward against the underside 146 of the lifting shaft 120. The resulting "upward" hydraulic force acting on the underside 146 of the lifting shaft 120 may counteract and exceed a downward force attributable to the weight of the lifting shaft 120 and a load supported by the lifting shaft 120, and, as a result, urge the lifting shaft 120 upward to extend/raise the lifting shaft 120 (e.g., to cause the lifting shaft 120 to translate vertically in the direction of arrow 124) along the lifting shaft longitudinal axis 162. During a lowering operation, the hydraulic pump 144 may be operated to pump hydraulic fluid from the hydraulic lift chamber 140 into the hydraulic fluid reservoir 142, to reduce hydraulic pressure in the hydraulic lift chamber 140. The reduction of hydraulic pressure in the hydraulic lift chamber 140 may reduce the upward hydraulic force that pushes upward against the underside 146 of the lifting shaft 120, and may create a vacuum that pulls downward on the lifting shaft 120, thereby causing the lifting shaft 120 to retract/lower (e.g., to translate vertically in the direction of arrow 126, along the lifting shaft longitudinal axis 162).

In some embodiments, the hydraulic lift system 104 includes a pressure relief valve 148 that regulates fluid communication between the hydraulic lift chamber 140 and the hydraulic fluid reservoir 142. During a lowering operation, the pressure relief valve 148 may be opened to enable hydraulic fluid to flow from the hydraulic lift chamber 140 into the hydraulic fluid reservoir 142. This flow may reduce hydraulic fluid pressure and volume in the hydraulic lift chamber 140, causing the lifting shaft 120 to retract/lower. In such an embodiment, the flow of the hydraulic fluid from the hydraulic lift chamber 140 into the hydraulic fluid reservoir 142 may result from a downward force attributable to the weight of the lifting shaft 120 or a load supported by the lifting shaft 120. In some embodiments, the pressure relief valve 148 is opened in place of or in conjunction with the hydraulic pump 144 being operated to pump hydraulic fluid from the hydraulic lift chamber 140 into the hydraulic fluid reservoir 142.

In some embodiments, the hydraulic pump 144 is an electric hydraulic pump. For example, the hydraulic pump 144 may be an electric hydraulic pump that operates using 12 V, direct current (DC) electrical power. In the illustrated embodiment, the lift system 104 includes a wiring harness 150 having a power lead 152 and a controller lead 154. The power lead 152 may be coupled to a power source (e.g., a 12 V DC electrical system of a vehicle to which the hitch lift system 100 is coupled) and be operable to route operational power from the power source to components of the lift system 104, including the hydraulic pump 144. The controller 154 may include, for example, a momentary toggle switch that can be toggled in one direction (e.g., up) to operate the hydraulic pump 144 to extend/raise the lifting shaft 120 or be toggled in another direction (e.g., down) to operate the hydraulic pump 144 or the pressure relief valve 148 to retract/lower the lifting shaft 120.

In some embodiments, the wiring harness 150 includes an intermediate disconnect 156. The intermediate disconnect 156 may include a first connector 156a on a first portion 150a of the wiring harness 150 connected to the lift system 104 and a second connector 156b (that is complementary to the first connector 156a) on a second portion 150b of the wiring harness 150 connected to the power lead 152 and the controller 154. During use, the first and second connectors 156a and 156b may be coupled to (or "plugged into") one another to facilitate the passage of power or signals along the wiring harness 150. The first and second connectors 156a and 156b may be de-coupled from (or "un-plugged from") one another to facilitate separation of the second portion 150b of the wiring harness 150 from the first portion 150a of the wiring harness 150 (and the lift system 104 and the receiver system 102). For example, where the controller 154 is mounted on a control panel of a vehicle and the power lead 152 is connected to a battery of the vehicle, and it is desirable to remove the lift system 104 and the receiver system 102 from the vehicle, the first and second connectors 156a and 156b may be un-plugged from one another, and the lift system 104 and the receiver system 102 may be removed from the receiver hitch of the vehicle without disturbing the mounted controller 154 or the connected power lead 152. If it is desirable to re-install the lift system 104 and the receiver system 102 to the vehicle, the receiver system 102 may be installed into the receiver hitch of the vehicle, and the first and second connectors 156a and 156b may be plugged into one another without disturbing the mounted controller 154 or the connected power lead 152.

In some embodiments, the receiver member 106 includes an elongated tubular member having a receiver member longitudinal axis 160 and the lifting shaft 120 includes an elongated cylindrical member having the lifting shaft longitudinal axis 162 (see, e.g., FIGS. 1I and 1J). When assembled, the receiver member 106 and the lifting shaft 120 may be oriented transverse to one another. For example, the receiver member longitudinal axis 160 and the lifting shaft longitudinal axis 162 may be oriented perpendicular to one another, as illustrated. During use, the receiver member 106 and its receiver member longitudinal axis 160 may be oriented horizontally, and the lifting shaft 120 and its lifting shaft longitudinal axis 162 may be oriented vertically, with the lifting shaft 120 extending in an upward direction. For example, the receiver of a vehicle may include a horizontally oriented square opening. The hitch lift system 100 may be mounted to the vehicle by orienting the receiver member 106 horizontally with the lifting shaft 120 oriented upward (e.g., with the upper end 128 of the lifting shaft 120 pointing upward, away from the ground under the vehicle), and sliding the receiver member 106 horizontally into the horizontally oriented square opening of the receiver. The engagement of the exterior of the square tubing of the receiver member 106 with the interior of the horizontally oriented square opening of the receiver may inhibit rotation of the receiver member 106 about the receiver member longitudinal axis 160, thereby maintaining the receiver member 106 in the horizontal orientation and the lifting shaft 120 in the upward orientation.

In some embodiments, the hydraulic lift 122 includes a housing 170. The housing 170 may enclose components of the hydraulic lift 122, including the pump 144, the hydraulic lift chamber 140, the hydraulic fluid reservoir 142, the hydraulic pump 144, and the pressure relief valve 148. The lifting shaft 120 may extend/retract though a hole in the housing 170. In some embodiments, the housing 170 includes right and left portion that are fastened to one another (e.g., using screws, an adhesive or the like) about the components of the hydraulic lift 122.

Figure 2:
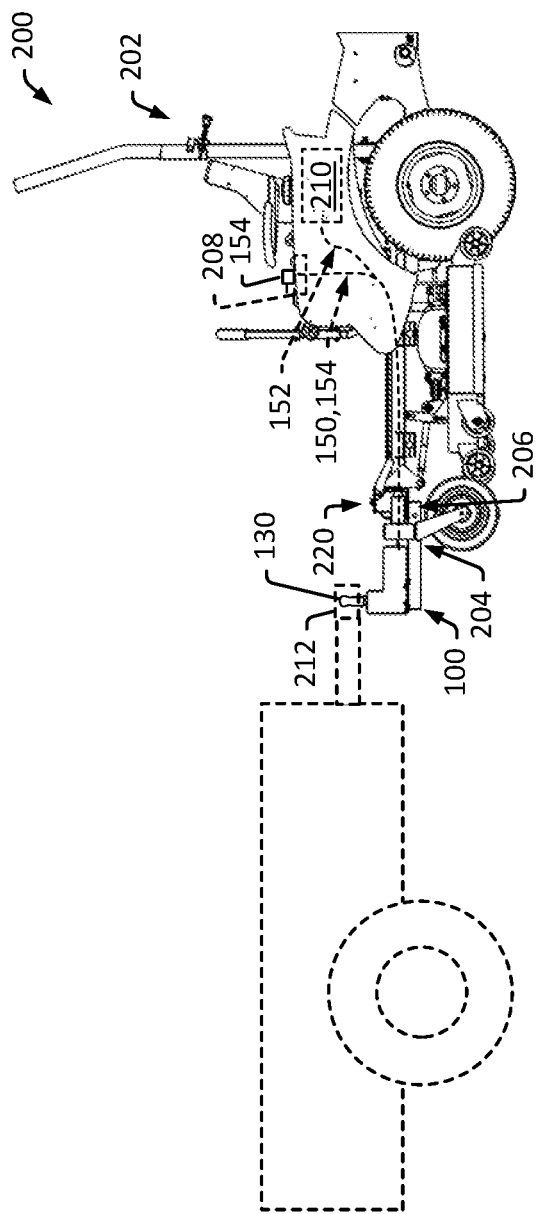
FIG. 2 is a diagram that illustrates a hitch lift system employed on a riding lawnmower in accordance with one or more embodiments.

FIG. 2 is a diagram that illustrates an example lifting environment 200 including an embodiment of the hitch lift system 100 mounted to a zero-turn radius (ZTR) riding lawnmower type vehicle 202. In the illustrated embodiment, the receiver member 106 of the hitch lift system 100 is mounted into an opening 204 of a receiver hitch (or "receiver") 206 of the vehicle 202. The controller 154 is mounted on a control panel 208 of the vehicle 202 and the power lead 152 is connected to a battery 210 of the vehicle 202. During a lifting operation, the hitch lift system 100 may be positioned such that the tow ball 130 is located under a coupler 212 of a load 214 (e.g., such as a coupler of a trailer), and the hitch lift system 100 may be operated to extend (or "raise") the lifting shaft 120 such that that the tow ball 130 moves upward to engage (or "hitch") from the tow ball 130 with the coupler 212. The hitch lift system 100 may be operated to further extend (or "raise") the lifting shaft 120 to raise (or "lift") the coupler 212 of the load 214. During a lowering operation, the hitch lift system 100 may be operated to retract (or "lower") the lifting shaft 120 such that that tow ball 130 moves downward to lower the coupler 212 of the trailer. The hitch lift system 100 may be operated to further retract the lifting shaft 120 to disengage (or "unhitch") the tow ball 130 from the coupler 212. Such a hitch lift system 100 may enable a person to hitch to, move with, and un-hitch from a load without having to engage in traditional hitching and un-hitching operations. For example, a person may simply drive the vehicle 202 into a position that aligns the tow ball 130 of the hitch lift system 100 under the coupler 212 of the load 214, operate the hitch lift system 100 to raise the lifting shaft 120 (e.g., remotely toggle a momentary toggle switch of the controller 154 to operate the hydraulic pump 144 to extend/raise the lifting shaft 120, while the person is seated on/in the vehicle 202) such that that tow ball 130 engages and lifts the coupler 212 of the load 214, drive the vehicle 202 some distance to tow the load 214 to a new location, operate the hitch lift system 100 to lower the lifting shaft 120 (e.g., remotely toggle the momentary toggle switch of the controller 154 to operate the hydraulic pump 144 to retract/lower the lifting shaft 120 while the person is seated on/in the vehicle 202) such that that tow ball 130 disengages from the coupler 212 of the load 214, and drive the vehicle 202 away from the load 214, leaving the load 214 in the new location. In some embodiments, the receiver 206 is mounted to a front-end of the vehicle 202 to facilitate towing of the load 214 in front of the vehicle 202. For example, in the illustrated embodiment of FIG. 2, the receiver 206 is mounted to a front end 220 of the riding lawnmower type vehicle 202 (e.g., in the direction that an operator typically faces during operation of the vehicle 202) and the hitch lift system 100 is installed into a forward facing opening 204 of the front mounted receiver 206. This may provide a person operating the vehicle 202 with a clear view of the receiver 206, the hitch lift system 100 (including the tow ball 130), the coupler 212 and the load 214 during hitching, towing and unhitching operations. In some embodiments, the receiver 206 is mounted to a rear-end of a vehicle, which may facilitate towing of a load behind the vehicle.

In some embodiments, a hitch lift system includes a mechanical lift system. A mechanical lift system may employ mechanical elements, such as levers, to provide vertical movement of a lifting shaft of the hitch lift system. For example, a hitch lift system may include a lever-based lifting system having an input that can receive an input force (e.g., a handle or pedal that can be pushed or pulled), and one or more levers that transmit the input force to an output that provides a corresponding lifting force to the lifting shaft (e.g., a series of levers having an end coupled to the lifting shaft that transfer force of the pushing or pulling to the lifting shaft).

FIGS. 3A-3G are diagrams that illustrate views of a "mechanical" hitch lift system 300 in accordance with one or more embodiments. FIGS. 3A-3D illustrate front-top-left, front-top-right, back-top-left, and back-top-right perspective views, respectively, of the hitch lift system 300 in an extended/raised configuration. FIGS. 3E and 3F illustrate right-side and left-side views, respectively, of the hitch lift system 300 in an extended/raised configuration. FIG. 3G illustrates a right-side view of the hitch lift system 300 in a retracted/lowered configuration.

In the illustrated embodiment, the hitch lift system 300 includes a receiver system 302 and a lift system 304. The receiver system 302 includes a receiver member 306 that is sized to engage a complementary receiver hitch of a vehicle. For example, the receiver member 306 may include elongated square tubing that is sized to slide into a complementary square opening of a receiver hitch of a vehicle, as described here. In the illustrated embodiment, the receiver member 306 includes a pin hole 308 (see, e.g., FIGS. 3E-3G). The pin hole 308 may be sized and positioned to receive a complementary receiver hitch pin that can be used to secure the receiver member 306 and the hitch lift system 300 to a receiver. For example, the receiver member 306 may be slid into a complementary square opening of a receiver hitch of a vehicle such that the pin hole 308 aligns with a complementary pin hole in the complementary square opening, and a receiver hitch pin may be slid through the pin hole 308 and the complementary pin hole to couple the receiver member 306 and the hitch lift system 300 to a receiver hitch. The receiver hitch pin may be held in place by a cotter pin.

In the illustrated embodiment, the receiver member 306 includes a lift system mounting bracket 310 (see, e.g., FIGS. 3E-3G). The lift system mounting bracket 310 may be removably coupled to the lift system 304 by way of fasteners 312, such as nuts and bolts, that extend through complementary holes of the lift system mounting bracket 310 and the lift system 304. This may enable the receiver member 306 to be replaced, for example, if a different type or size receiver member is needed for a given vehicle, or the receiver member 306 is damaged. In some embodiments, the lift system mounting bracket 310 is fixedly coupled to the lift system 304, for example, by way of a weld. The receiver member 306 may be removably coupled to the lift system mounting bracket 310 by way of fasteners, such as nuts and bolts, that extend through complementary holes of the lift system mounting bracket 310 and the receiver member 306. In some embodiments, the lift system mounting bracket 310 is fixedly coupled to the receiver member 306, for example, by way of a weld.

In the illustrated embodiment, the lift system 304 is a "mechanical" lift system that includes a lifting member 320 and a lever mechanical lift 322. The lift system 304 may be operable to cause vertical movement of the lifting member 320. For example, during use, the lifting member 320 may be raised/extended (in the direction of arrow 324) or lowered/retracted (in the direction of arrow 326). The lifting member 320 may be raised, for example, to cause an upper end 328 of the lifting member 320 to engage and lift a complementary coupler of a load, such as a coupler of a trailer. The lifting member 320 may be lowered to, for example, lower or disengage from a complementary coupler of a load. In some embodiments, the lifting member 320 moves (e.g., is raised or lowered) in an arced path with a longitudinal axis of the lifting member 320 remaining in the same orientation (e.g., the longitudinal axis of the lifting member 320 remaining vertical throughout the vertical range of motion). In some embodiments, the lifting shaft 120 has a stroke length (D) defined by a vertical distance of travel of the lifting member 320, which may be the difference between the position of the lifting member 320 in a fully extended configuration and the position of the lifting member 320 in a fully retracted configuration (see, e.g., FIGS. 3E-3G). The stroke length (D) may be about 6-18 inches.

In the illustrated embodiment, the lifting member 320 includes an upper end (or "lifting end") 328 that is rounded to facilitate engagement with a load. For example, in the illustrated embodiment, the upper end 328 of the lifting member 320 includes a rounded tow ball 330 that facilitates the engagement of the upper end 328 of the lifting member 320 with a coupler shaped to accept a rounded tow ball. The tow ball 330 may include a 1⅞ inch, two inch, or 2 5/16 inch tow ball, for example. In some embodiments, the tow ball 330 is integrated with elements of the lifting member 320. For example, the tow ball 330 may be machined, forged, welded or otherwise formed as an integrated element of the upper end 328 of the lifting member 320. In some embodiments, the tow ball 330 is removably coupled to a portion of the lifting member 320. For example, the lifting member 320 may have a female thread 331 extending into an upper end of an elongated member forming a base 334 of the lifting shaft, and the tow ball 330 may be a traditional tow ball having a complementary male threaded stem that is threaded into the female thread 331. This may enable the tow ball 330 to be replaced, for example, if different loads use different sizes or styles of tow balls or the tow ball is damaged.

In some embodiments, the lift system 304 is a levered-linkage system that is operable to transfer force to the lifting member 320 to provide for raising or lowering of the lifting member 320. For example, in the illustrated embodiment, the lift system 304 includes a levered-linkage system having a handle member 332, a first cam member 333, a second cam member 334, right and left lifting linkages 336a and 336b, upper and lower guide linkages 338a and 338b, a base 340 and a locking member 342.

The handle member 332 includes a handle shaft 352 and a handle 350 at a proximal end of the handle shaft 352. The first cam member 333 includes an elongated rod member 360 having a U-link 362 at a first/upper end and an L-link 364 at a second/lower end. The L-link 364 includes a U-link 366 terminating into right and left L-shaped ends 368a and 368b. The second cam member 334 includes an elongated rod member 370 having a first/upper U-link 372 at a first/upper end and a second/lower U-link 374 at a second/lower end. The base 340 includes right and left base panels 380a and 380b. The right and left lifting linkages 336a and 336b each include an elongated member. The right and left guide linkages 338a and 338b each include an elongated member. A distal portion of the handle shaft 352 is coupled to the U-link 362 and the first/upper U-link 372 by way of fasteners 390a and 390b, respectively. A fastener may include, for example, a cylindrical pin (e.g., a nut and bolt assembly). The right and left L-shaped ends 368a and 368b are coupled to the right and left base panels 380a and 380b by way of a fastener 391, and are each coupled to first/upper ends of respective ones of the right and left lifting linkages 336a and 336b by way of fasteners 392a and 392b, respectively. Second/lower ends of the right and left lifting linkages 336a and 336b are coupled to the lifting member 320 by way of a fastener 393. Proximal ends of the right and left guide linkages 338a and 338b are coupled to the right and left base panels 380a and 380b by way of fasteners 394, and distal ends of the right and left guide linkages 338a and 338b are coupled to the lifting member 320 by way of fasteners 395. The lift system mounting bracket 310 may be removably coupled to the right and left base panels 380a and 380b by way of the fasteners 312 that extend through complementary holes of the lift system mounting bracket 310 and the right and left base panels 380a and 380b. In some embodiments, the lift system mounting bracket 310 is fixedly coupled to the right and left base panels 380a and 380b, for example, by way of weld. The lift system mounting bracket 310 may be sized to receive the receiver member 306. For example, the lift system mounting bracket 310 may have a square opening about two inches square or 1¼ inches square in size, similar to a complementary opening of a receiver hitch of a vehicle. The locking member 342 includes an L-shaped member having a first/proximal end coupled to a mid-portion of the elongated rod member 360 of the first cam member 333 by way of a fastener 398. A second/distal end (e.g., a "hook") of the locking member 342 may be selectively inserted into a slot located between the right and left base panels 380a and 380b, with the locking member 342 biased such that a lip of the locking member 342 engages an edge of the slot to "lock" the lift system 304 in an "up" position.

During use, a person may exert a "lifting" force on the handle 350 (e.g., in the direction of arrow 400) to lift the lifting member 320. The lifting force is transferred by way of the lift system 304 to generate a corresponding upward force on the lifting member 320 (in the direction of arrow 324). The upward force may cause the lifting member 320 to move upward along an arced path (represented by arrow 403) defined by rotation of the right and left guide linkages 338a and 338b about fasteners 394. The lifting force may be, for example, a "pulling" force that is large enough to counteract and exceed a downward force attributable to the weight of the lifting member 320 and a load supported by the lifting member 320, and, as a result, urge the lifting member 320 upward to raise the tow ball 330 (e.g., to cause the lifting member 320 and the tow ball 330 to move upward along the arced path 403). With the lifting member 320 moved into an "up" position, the locking member 342 may engage the complementary slot to "lock" the lift system 304 in the "up" position, such that the lifting member 320 and the tow ball 330 are inhibited from moving downward.

During use, a person may exert a "lowering" force on the handle 350 to lower the lifting member 320. The lowering force is transferred by way of the lift system 304 to generate a corresponding force on the lifting member 320. The lowering force may cause the lifting member 320 to move downward along the arced path 403. The lowering force may be, for example, a "pushing force" (or a "pulling" force that is not large enough to counteract a downward force attributable to the weight of the lifting member 320 and a load supported by the lifting member 320) that allows the lifting member 320 to move downward to lower the tow ball 330 (e.g., to cause the lifting member 320 and the tow ball 330 to move downward along the arced path 403). Before lowering the lifting member 320, the person may rotate the locking member 342 out of engagement with the complementary slot to "unlock" the lift system 304 such that the lifting member 320 and the tow ball 330 are allowed to move downward.

During raising or lowing, the first cam member 333 may rotate about the fastener 391. The right and left lifting linkages 336a and 336b may rotate about the fastener 393 to facilitate the first/upper ends of the right and left lifting linkages 336a and 336b moving with the right and left L-shaped ends 368a and 368b as the first cam member 333 rotates about the fastener 391. The dual linkage provided by the right and left guide linkages 338a and 338b may cause the lifting member 320 to maintain its vertical orientation (represented by longitudinal axis 362) throughout the range of motion along the arced path 403. This may facilitate alignment of the lifting member 320 and the tow ball 330 with a complementary coupler of a load, and may facilitate the tow ball 330 remaining in engagement with the complementary coupler throughout the range of motion along the arced path 403.

In some embodiments, the receiver member 306 includes an elongated tubular member having a receiver member longitudinal axis 361 and the lifting member 320 includes an elongated member having the lifting member longitudinal axis 362 (see, e.g., FIGS. 3E-3G). When assembled, the receiver member 306 and the lifting member 320 may be oriented transverse to one another. For example, the receiver member longitudinal axis 361 and the lifting member longitudinal axis 362 may be oriented perpendicular to one another, as illustrated. During use, the receiver member 306 and its receiver member longitudinal axis 361 may be oriented horizontally, and the lifting member 320 and its lifting member longitudinal axis 362 may be oriented vertically, with the lifting member 320 extending in an upward direction. For example, the receiver of a vehicle may include a horizontally oriented square opening. The hitch lift system 300 may be mounted to the vehicle by orienting the receiver member 306 horizontally with the lifting member 320 oriented upward (e.g., with the upper end 328 of the lifting member 320 pointing upward, away from the ground under the vehicle), and sliding the receiver member 306 horizontally into the horizontally oriented square opening of the receiver. The engagement of the exterior of the square tubing of the receiver member 306 with the interior of the horizontally oriented square opening of the receiver may inhibit rotation of the receiver member 306 about the receiver member longitudinal axis 361, thereby maintaining the receiver member 306 in the horizontal orientation and the lifting member 320 in the upward orientation.

Figure 4:
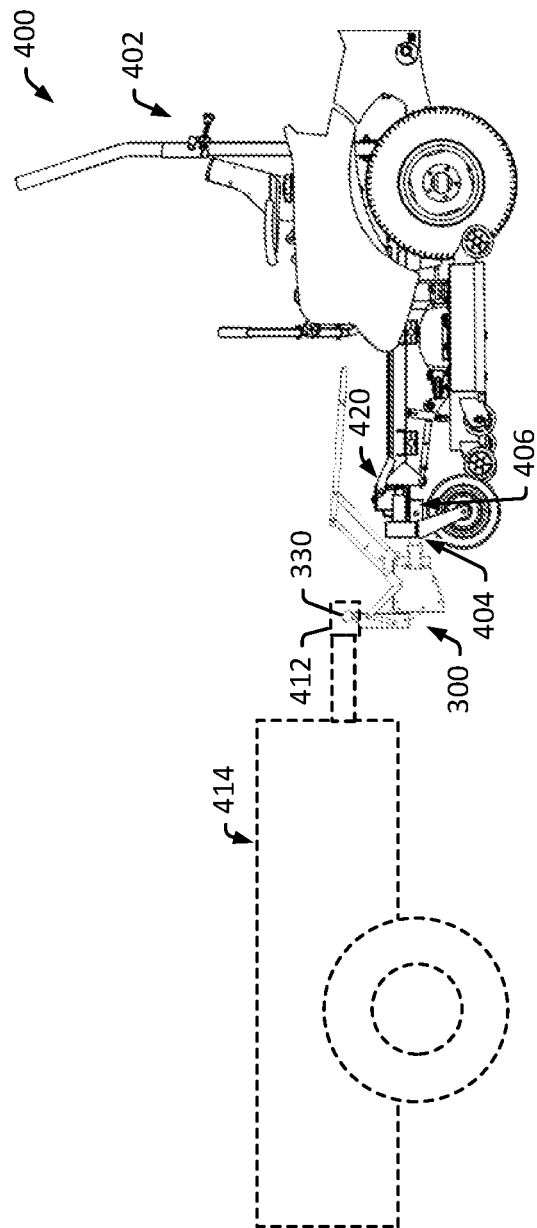
FIG. 4 is a diagram that illustrates a mechanical hitch lift system employed on a riding lawnmower in accordance with one or more embodiments.

FIG. 4 is a diagram that illustrates an example lifting environment 400, including an embodiment of the hitch lift system 300 mounted to a ZTR riding lawnmower type vehicle 402. In the illustrated embodiment, the receiver member 306 of the hitch lift system 300 is mounted into an opening 404 of a receiver hitch (or "receiver") 406 of the vehicle 402. During a lifting operation, the hitch lift system 300 may be positioned such that the tow ball 330 is located under a coupler 412 of a load 414 (e.g., such as a coupler of a trailer), and the hitch lift system 300 may be operated to extend (or "raise") the lifting member 320 such that that the tow ball 330 moves upward to engage (or "hitch") the tow ball 330 with the coupler 412. The hitch lift system 300 may be operated to further extend (or "raise") the lifting member 320 to raise (or "lift") the coupler 412 of the load 414. During a lowering operation, the hitch lift system 300 may be operated to retract (or "lower") the lifting member 320 such that that tow ball 330 moves downward to lower the coupler 412 of the load 414. The hitch lift system 300 may be operated to further retract the lifting member 320 to disengage (or "un-hitch") the tow ball 330 from the coupler 412. Such a hitch lift system 300 may enable a person to hitch to, move with, and un-hitch from a load without having to engage in traditional hitching and un-hitching operations. For example, a person may simply drive the vehicle 402 into a position that aligns the tow ball 330 of the hitch lift system 300 under the coupler 412 of the load 414, operate the hitch lift system 300 to raise the lifting member 320 (e.g., exert a pulling force on the handle 350 to extend/raise the lifting member 320 while the person is seated on/in the vehicle 402) such that that tow ball 330 engages and lifts the coupler 412 of the load 414, drive the vehicle 402 some distance to tow the load 414 to a new location, operate the hitch lift system 300 to lower the lifting member 320 (e.g., exert a pushing force on the handle 350 to retract/lower the lifting member 320 while the person is seated on/in the vehicle 402) such that that tow ball 330 disengages from the coupler 412 of the load 414, and drive the vehicle 402 away from the load 414, leaving the load 414 in the new location. In some embodiments, the receiver 406 is mounted to a front-end of the vehicle 402 to facilitate towing of the load 414 in-front of the vehicle 402. For example, in the illustrated embodiment of FIG. 4, the receiver 406 is mounted to a front end 420 of the riding lawnmower type vehicle 402 (e.g., in the direction that an operator typically faces during operation of the vehicle 402), and the hitch lift system 300 is installed into the front mounted receiver 306. This may provide a person operating the vehicle 402 with a clear view of the receiver 406, the hitch lift system 300 (including the tow ball 330), the coupler 412 and the load 414 during hitching, towing and unhitching operations. In some embodiments, the receiver 406 is mounted to a rear-end of the vehicle 402. This may facilitate towing of the load 414 behind the vehicle 402.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

As used throughout this application, the word "may" is used in a permissive sense (such as, meaning having the potential to), rather than the mandatory sense (such as, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A, B or C may refer to the element including A, B, C, A and B, A and C, B and C, or A, B and C. As used throughout this application, the term "from" does not limit the associated operation to being directly from. Thus, for example, receiving an item "from" an entity may include receiving an item directly from the entity or indirectly from the entity (e.g., by way of an intermediary entity).

What is claimed is:

1. A hitch lift system comprising:
    a receiver system comprising a receiver member configured to engage a complementary opening of a receiver hitch of a vehicle; and
    a hydraulic lift system comprising:
        a lifting shaft comprising an upper end configured to engage a complementary coupler of a load and configured to translate vertically in an upward direction along a straight path to lift the complementary coupler of the load along the straight path; and
        a hydraulic lift comprising:
            a hydraulic lift chamber, wherein a lower end of the lifting shaft is disposed in the hydraulic lift chamber, and
            a hydraulic pump configured to pump hydraulic fluid into the hydraulic lift chamber to generate hydraulic pressure in the hydraulic lift chamber that acts against an underside of the lower end of the lifting shaft to generate an upward force to cause the lifting shaft to translate vertically in the upward direction.

2. The system of claim 1, wherein the receiver member is configured to slidingly engage the complementary opening of the receiver hitch of the vehicle.

3. The system of claim 1, wherein the receiver member comprises a square tubular member configured to slide into the complementary opening of the receiver hitch of the vehicle.

4. The system of claim 1, wherein the receiver member comprises a 1¼ inch or 2 inch square tubular member.

5. The system of claim 1, wherein the lifting shaft comprises an elongated shaft and the upper end comprises a rounded lifting end configured to engage the complementary coupler of the load.

6. The system of claim 1, wherein the lifting shaft comprises an elongated shaft and the upper end comprises a tow ball configured to engage the complementary coupler of the load.

7. The system of claim 1, wherein the hydraulic lift is configured to reduce hydraulic pressure to cause the lifting shaft to translate vertically in a downward direction to lower the complementary coupler of the load.

8. The system of claim 1, wherein the hydraulic lift system comprises:
- a hydraulic fluid reservoir configured to house hydraulic fluid,
- wherein the hydraulic pump is configured to pump the hydraulic fluid from the hydraulic fluid reservoir into the hydraulic lift chamber to generate the hydraulic pressure in the hydraulic lift chamber to cause the lifting shaft to translate vertically in the upward direction.

9. The system of claim 8, wherein the hydraulic lift system is configured to displace hydraulic fluid from the hydraulic lift chamber to reduce hydraulic pressure in the hydraulic lift chamber to cause the lifting shaft to translate vertically in a downward direction to lower the complementary coupler of the load.

10. The system of claim 8, wherein the hydraulic pump is configured to pump hydraulic fluid from the hydraulic lift chamber to the hydraulic fluid reservoir to reduce hydraulic pressure in the hydraulic lift chamber to cause the lifting shaft to translate vertically in a downward direction to lower the complementary coupler of the load.

11. The system of claim 8, wherein the hydraulic pump comprises an electric pump.

12. The system of claim 11, wherein the electric pump is configured to operate using 12 volt power.

13. The system of claim 1, wherein the hitch lift system further comprises a wiring harness comprising a power lead configured to route operational power to the hydraulic hitch lift system.

14. The system of claim 1, wherein the receiver member comprises a receiver member longitudinal axis, the lifting shaft comprise a lifting shaft longitudinal axis, the lifting shaft longitudinal axis is transverse to the receiver member longitudinal axis, the receiver is configured to be oriented such that the receiver member longitudinal axis is oriented horizontally during use, and the lifting shaft is configured to be oriented such that the lifting shaft longitudinal axis is oriented vertically during use.

15. The system of claim 1, wherein the vehicle comprises a motor vehicle.

16. The system of claim 1, wherein the vehicle comprises a riding lawn mower.

17. The system of claim 1, wherein the hitch lift system further comprises a remote controller configured to be operated by an operator of the vehicle to control the hitch lift system to lift the complementary coupler of the load.

18. A hitch lift system comprising:
- a receiver member having a receiver member longitudinal axis and being configured to engage a complementary opening of a receiver hitch of a vehicle; and
- a hydraulic lift system comprising:
  - a lifting shaft comprising an upper end configured to engage a complementary coupler of a load, the lifting shaft having a lifting shaft longitudinal axis oriented transverse to the receiver member longitudinal axis, the lifting shaft configured to extend and retract in a straight path along the lifting shaft longitudinal axis such that the upper end is configured to translate vertically along the straight path; and
  - a hydraulic lift comprising:
    - a hydraulic lift chamber, wherein a lower end of the lifting shaft is disposed in the hydraulic lift chamber, and
    - a hydraulic pump configured to pump hydraulic fluid into the hydraulic lift chamber to generate hydraulic pressure in the hydraulic lift chamber that acts against an underside of the lower end of the lifting shaft to generate an upward force to cause the lifting shaft to extend along the lifting shaft longitudinal axis.

19. A hitch lift system comprising:
- an elongated receiver member configured to engage a complementary opening of a receiver hitch of a vehicle; and
- a lift system comprising:
  - a lifting shaft comprising a first end configured to engage a complementary coupler of a load, the lifting shaft configured to extend and retract vertically along a straight path such that the first end is configured to translate vertically along the straight path; and
  - a hydraulic lift configured to regulate the vertical extension and retraction of the lifting shaft, the hydraulic lift comprising a hydraulic lift chamber, wherein a lower end of the lifting shaft is disposed in the hydraulic lift chamber,
  - wherein pumping hydraulic fluid into the hydraulic chamber is configured to generate hydraulic pressure that acts against an underside of the lower end of the lifting shaft to generate a force to cause the lifting shaft to extend vertically along the straight path.

* * * * *

UNITED STATES PATENT AND TRADEMARK OFFICE
CERTIFICATE OF CORRECTION

| | | |
|---|---|---|
| PATENT NO. | : 11,351,822 B1 | Page 1 of 1 |
| APPLICATION NO. | : 16/358009 | |
| DATED | : June 7, 2022 | |
| INVENTOR(S) | : Zachary Crowl | |

It is certified that error appears in the above-identified patent and that said Letters Patent is hereby corrected as shown below:

On the Title Page

Item (73) Assignee
Replace "Battle Armor Designs, LLP, Batesville, AR (US)"
With -- Battle Armor Designs, LLC, Batesville, AR (US) --

Signed and Sealed this
Eighteenth Day of October, 2022

Katherine Kelly Vidal
*Director of the United States Patent and Trademark Office*